United States Patent
Sampath et al.

(10) Patent No.: US 11,193,720 B2
(45) Date of Patent: Dec. 7, 2021

(54) GAS TURBINE ENGINE HAVING A HEAT ABSORPTION DEVICE AND AN ASSOCIATED METHOD THEREOF

(71) Applicant: General Electric Company, Schenectady, NY (US)

(72) Inventors: Karthikeyan Sampath, Bangalore (IN); Atanu Saha, Bangalore (IN); Bhaskar Nanda Mondal, Bangalore (IN); Sanjeev Sai Kumar Manepalli, Bangalore (IN)

(73) Assignee: General Electric Company, Schenectady, NY (US)

(*) Notice: Subject to any disclaimer, the term of this patent is extended or adjusted under 35 U.S.C. 154(b) by 44 days.

(21) Appl. No.: 16/828,186

(22) Filed: Mar. 24, 2020

(65) Prior Publication Data
US 2020/0240720 A1   Jul. 30, 2020

Related U.S. Application Data

(63) Continuation of application No. 15/702,730, filed on Sep. 12, 2017, now Pat. No. 10,627,167.

(51) Int. Cl.
*F02C 7/14* (2006.01)
*F02C 7/18* (2006.01)
(Continued)

(52) U.S. Cl.
CPC .............. *F28D 20/023* (2013.01); *F02C 6/08* (2013.01); *F02C 7/14* (2013.01); *F02C 7/185* (2013.01);
(Continued)

(58) Field of Classification Search
CPC .... F02C 6/08; F02C 7/12; F02C 7/185; F02C 9/18; F02C 7/14; F05D 2260/207; F05D 2260/213; F28D 20/02
See application file for complete search history.

(56) References Cited

U.S. PATENT DOCUMENTS 5,232,672 A   8/1993   Spadaccini et al.
7,716,913 B2   5/2010   Rolt
(Continued)

FOREIGN PATENT DOCUMENTS

EP   0565442 A1   10/1993
EP   1813781 A1   8/2007
EP   3379149 A1   9/2018

*Primary Examiner* — Todd E Manahan
*Assistant Examiner* — Todd N Jordan
(74) *Attorney, Agent, or Firm* — Dority & Manning, P.A.

(57) ABSTRACT

A gas turbine engine having a heat absorption device and an associated method are disclosed. The gas turbine engine includes a compressor having a compressor discharge nozzle, a combustor coupled to the compressor, a turbine coupled to the combustor and the compressor, a fluid flow passage fluidly coupling the compressor and the turbine and bypassing the combustor, and a heat absorption device disposed fluidly along the fluid flow passage at a first predefined location. The heat absorption device includes a casing having an inlet and an outlet, a flow path within the casing and extending between the inlet and the outlet, wherein the flow path directs an input bleed flow diverted from a fluid stream discharged from the compressor, and a phase change material hermetically sealed within the casing. The phase change material is separated from the flow path. The heat absorption device is configured to exchange heat between the phase change material and the input bleed flow to generate an output bleed flow of a different temperature than the input bleed flow and discharge the output bleed flow to a second predefined location different from the first predefined location.

17 Claims, 6 Drawing Sheets

(51) Int. Cl.

| | |
|---|---|
| *F02C 6/08* | (2006.01) |
| *F28D 20/02* | (2006.01) |
| *F02C 9/18* | (2006.01) |
| B64D 33/08 | (2006.01) |
| F28D 21/00 | (2006.01) |

(52) U.S. Cl.
CPC ............... *F02C 9/18* (2013.01); *B64D 33/08* (2013.01); *F05D 2220/32* (2013.01); *F05D 2260/207* (2013.01); *F05D 2260/213* (2013.01); *F05D 2260/232* (2013.01); *F28D 2021/004* (2013.01); *F28D 2021/0021* (2013.01); *F28D 2021/0026* (2013.01)

(56) References Cited

U.S. PATENT DOCUMENTS

| | | |
|---|---|---|
| 9,036,352 B2 | 5/2015 | Engelhardt et al. |
| 9,422,063 B2 | 8/2016 | Diaz |
| 9,435,224 B2 | 9/2016 | Raison et al. |
| 9,476,313 B2 | 10/2016 | Caprario et al. |
| 9,534,537 B2 | 1/2017 | Gagne et al. |
| 9,624,831 B2 | 4/2017 | Brousseau et al. |
| 10,415,474 B2 | 9/2019 | Riaz et al. |
| 2010/0157525 A1 | 6/2010 | Ullman et al. |
| 2010/0263375 A1 | 10/2010 | Grieve |
| 2015/0000291 A1 | 1/2015 | Smith et al. |
| 2015/0159555 A1 | 6/2015 | Heinrich et al. |
| 2016/0290174 A1 | 10/2016 | Ekanayake et al. |
| 2016/0290230 A1 | 10/2016 | Ekanayake et al. |
| 2016/0290231 A1 | 10/2016 | Ekanayake et al. |
| 2017/0074166 A1 | 3/2017 | Gagne et al. |
| 2017/0311478 A1 | 10/2017 | Engelhardt et al. |
| 2018/0266688 A1 | 9/2018 | Pearson |

GAS TURBINE ENGINE HAVING A HEAT ABSORPTION DEVICE AND AN ASSOCIATED METHOD THEREOF

CROSS-REFERENCE TO RELATED APPLICATIONS

The present application claims the benefit of the earliest available effective filing date and is a continuation application of U.S. patent application Ser. No. 15/702,730 titled "GAS TURBINE ENGINE HAVING A HEAT ABSORPTION DEVICE AND AN ASSOCIATED METHOD THEREOF" having a filing date of Sep. 12, 2017 and which is incorporated herein by reference in its entirety.

FIELD

Embodiments of the present invention relate generally to gas turbine engines and more particularly to a heat absorption device used in gas turbine engines and an associated method thereof.

BACKGROUND

Turbomachines, such as a gas turbine engine include a compressor, a combustor, and a turbine. Such a gas turbine engine may be used for driving a propulsion system, such as an aircraft. During normal operating condition of the propulsion system, the gas turbine engine is configured to generate a fluid stream, for example, a compressed fluid from the compressor or an expanded exhaust stream from the turbine, which are at a nominal operating temperature. Typically, some portions of such a fluid stream are discharged to certain other locations in the propulsion system, for example, for cooling one or more components in the propulsion system. The portions of the fluid stream may be discharged via a fluid flow passage or a conduit for cooling the one or more components. One such fluid flow passage may include a rotor-stator cavity of the compressor and the turbine, a labyrinth seal, and an angel wing coupled to one rotor of the turbine. However, during certain transient operating conditions, such as take-off or climb, the fluid stream generated by the gas turbine engine are typically at a higher operating temperature. In such scenarios, the portions of the fluid stream discharged to certain other locations in the propulsion system may cause creep and degradation of the one or more components in the fluid flow passage. In some other scenarios, the one or more components disposed in the fluid flow passage may be made of a high temperature alloy material to withstand the higher operating temperature of the portions of the fluid stream. However, the one or more components made of the high temperature alloy material may further increase the cost of the propulsion system.

Thus, there is a need for an enhanced gas turbine engine and an associated method.

BRIEF DESCRIPTION

Aspects and advantages of the invention will be set forth in part in the following description, or may be obvious from the description, or may be learned through practice of the invention.

An aspect of the present disclosure is directed to a gas turbine engine having a heat absorption device and an associated method are disclosed. The gas turbine engine includes a compressor having a compressor discharge nozzle, a combustor coupled to the compressor, a turbine coupled to the combustor and the compressor, a fluid flow passage fluidly coupling the compressor and the turbine and bypassing the combustor, and a heat absorption device disposed fluidly along the fluid flow passage at a first predefined location. The heat absorption device includes a casing having an inlet and an outlet, a flow path within the casing and extending between the inlet and the outlet, wherein the flow path directs an input bleed flow diverted from a fluid stream discharged from the compressor, and a phase change material hermetically sealed within the casing. The phase change material is separated from the flow path. The heat absorption device is configured to exchange heat between the phase change material and the input bleed flow to generate an output bleed flow of a different temperature than the input bleed flow and discharge the output bleed flow to a second predefined location different from the first predefined location.

Another aspect of the present disclosure is directed to a system including a frame, a plurality of airfoils coupled to the frame, and at least one gas turbine engine coupled to the plurality of airfoils. The at least one gas turbine engine includes a compressor having a compressor discharge nozzle, a combustor coupled to the compressor, a turbine coupled to the combustor and the compressor, a fluid flow passage fluidly coupling the compressor and the turbine and bypassing the combustor, and a heat absorption device disposed fluidly along the fluid flow passage at a first predefined location. The heat absorption device includes a casing having an inlet and an outlet. A flow path within the casing is extended between the inlet and the outlet. The flow path directs an input bleed flow diverted from a fluid stream discharged from the compressor. A phase change material is hermetically sealed within the casing. The phase change material is separated from the flow path. The heat absorption device is configured to exchange heat between the phase change material and the input bleed flow to generate an output bleed flow of a different temperature than the input bleed flow and discharge the output bleed flow to a second predefined location different from the first predefined location.

Yet another aspect of the present disclosure is directed to a method for operating a turbomachine. The method includes directing an input bleed flow from a fluid stream discharged from a compressor of a gas turbine engine to a bleed fluid cavity formed at a first predefined location at a fluid flow passage fluidly upstream of a turbine of the gas turbine engine and bypassing a combustor of the gas turbine engine. The input bleed flow is directed from an inlet of a casing of a heat absorption device to an outlet of the casing of the heat absorption device and through a flow path extending between the inlet and the outlet, wherein the heat absorption device is disposed in the fluid flow passage. Heat between the input bleed flow and a phase change material of the heat absorption device is exchanged to generate an output bleed flow at a different temperature than the input bleed flow. The phase change material is hermetically sealed within the casing and is separated from the flow path. The output bleed flow is discharged to a second predefined location in the gas turbine engine, wherein the second predefined location is different from the first predefined location.

BRIEF DESCRIPTION OF THE DRAWINGS

These and other features and aspects of embodiments of the disclosed technique will become better understood when the following detailed description is read with reference to the accompanying drawings in which like characters represent like parts throughout the drawings, wherein.

DETAILED DESCRIPTION

Embodiments discussed herein disclose a plurality of turbojet engines or turboprop engines, such as a gas turbine engine. In certain embodiments, the gas turbine engine is used for driving a propulsion system, for example, an aviation-based machine, a land-based machine, or a marine-based machine. In one embodiment, the aviation-based machine may be an aircraft. In one embodiment, the gas turbine engine includes a compressor, a combustor, a turbine, a bleed fluid cavity, and a heat absorption device. The combustor is coupled to the compressor. The turbine is coupled to the compressor and the combustor. The bleed fluid cavity is formed at a first predefined location in the compressor. The heat absorption device is disposed in the bleed fluid cavity. The heat absorption device includes a casing, a flow path, and a phase change material. The casing includes an inlet and an outlet. The flow path is within the casing and extends between the inlet and the outlet. The flow path directs an input bleed fluid separated from a fluid stream discharged from the compressor. The phase change material is filled in the casing, separated from the flow path. In certain embodiments, the heat absorption device is configured to exchange heat between the phase change material and the input bleed fluid to generate an output bleed fluid and discharge the output bleed fluid to a second predefined location different from the first predefined location. In one or more embodiments, the phase change material is hermetically sealed in the casing such that the input bleed fluid is not in physical contact with the phase change material while exchanging heat with the phase change material. In certain embodiments, exchanging heat between the phase change material and the input bleed fluid involves changing the phase change material from a first phase to a second phase different from the first phase, during one or more operating conditions of the gas turbine engine. In some embodiments, the first phase may be solid phase and the second phase may be a liquid phase. Latent heat of the input bleed fluid may be used for changing the phase/physical state of the phase change material from the first phase to the second phase. In such embodiments, the one or more operating conditions of the gas turbine engine may include a take-off stage or climbing stage of the propulsion system.

To clearly and concisely describe the subject matter, the following definitions are provided for specific terms, which are used throughout the following description and the appended claims, unless specifically denoted otherwise with respect to a particular embodiment. The term "coupled" as used herein may refer to "fluidly coupled" or "aerodynamic coupled", or "physically coupled", or "operationally coupled". For example, the combustor is fluidly or operationally coupled to the compressor. In another example, a nozzle of a turbine may be physically coupled to a casing.

Figure 1:
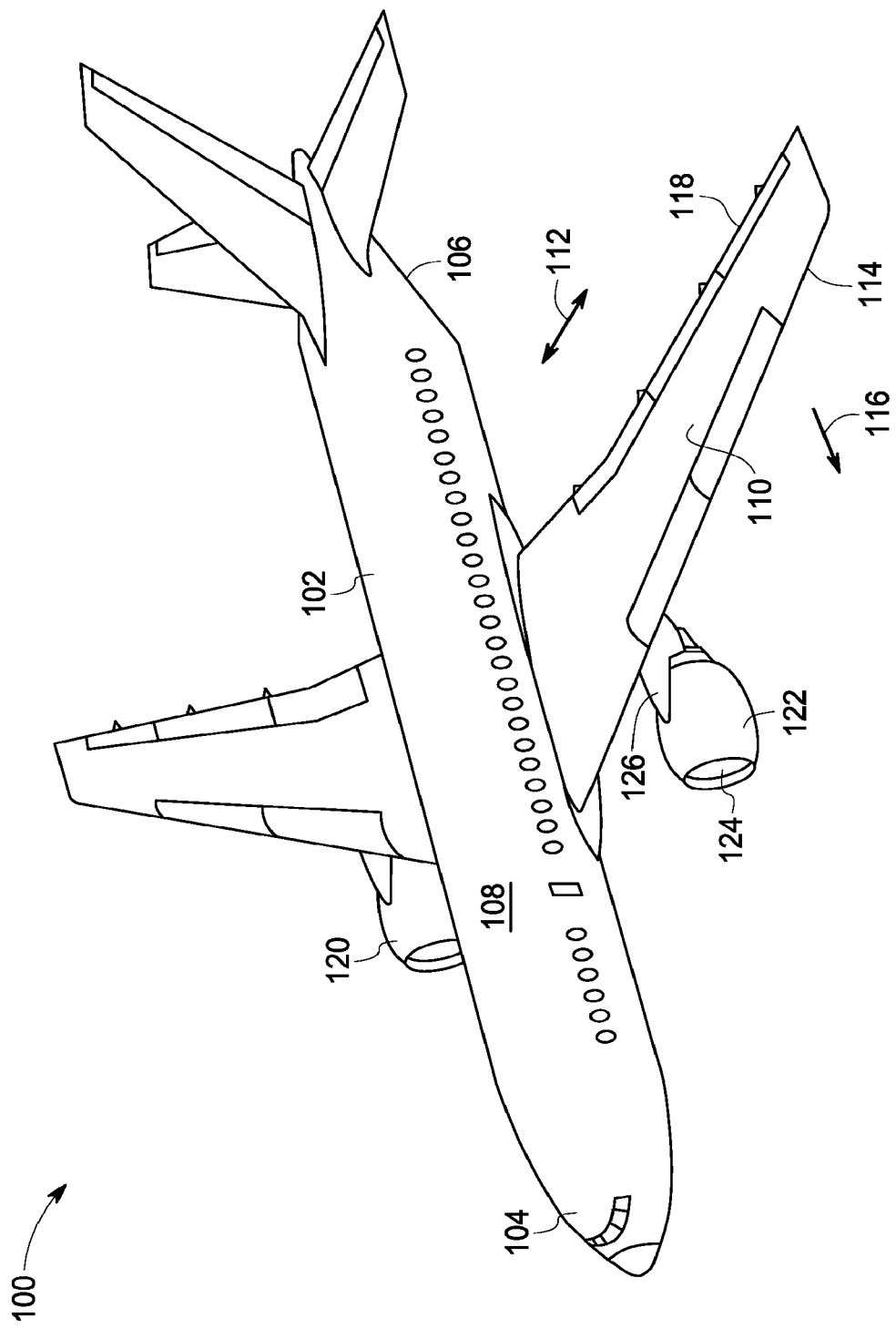
FIG. 1 illustrates a perspective view of a propulsion system including a plurality of turbojet engines, such as a gas turbine engine in accordance with one embodiment.

FIG. 1 represents a perspective view of a propulsion system 100 including a plurality of turbojet engines or turboprop engines, such as a gas turbine engine 122 in accordance with one embodiment. In the illustrated embodiment, the propulsion system 100 is an aircraft. The propulsion system 100 includes a frame 102 (also referred to as "fuselage") that includes a nose 104, a tail 106, and a hollow elongate body 108 extending therebetween the nose 104 and the tail 106. The propulsion system 100 also includes a plurality of airfoils 110 (also referred to as "wings"), each extending away from frame 102 along a lateral direction 112 of the propulsion system 100. Each of the plurality of airfoils 110 includes a forward leading edge 114 oriented in a direction of motion 116 of propulsion system 100 during normal flight and an aft trailing edge 118 opposite to the forward leading edge 114. Each of the plurality of gas turbine engines 122 is configured to drive a high bypass turbofan assembly/fan assembly 124 to generate a thrust for driving the propulsion system 100. In some embodiments, an engine pylon 126, for example, may couple each of the plurality of gas turbine engines 122 to the plurality of airfoils 110 and the frame 102. In certain embodiments, the at least one gas turbine engine 122 includes a compressor, a combustor, a turbine, a bleed fluid cavity, and a heat absorption device (not shown in FIG. 1). In such example embodiments, the heat absorption device is configured to cool an input bleed fluid of the gas turbine engine by indirectly exchanging heat with a phase change material and generate an output bleed fluid which may be discharged to certain predefined locations of the propulsion system 100.

Figure 2:
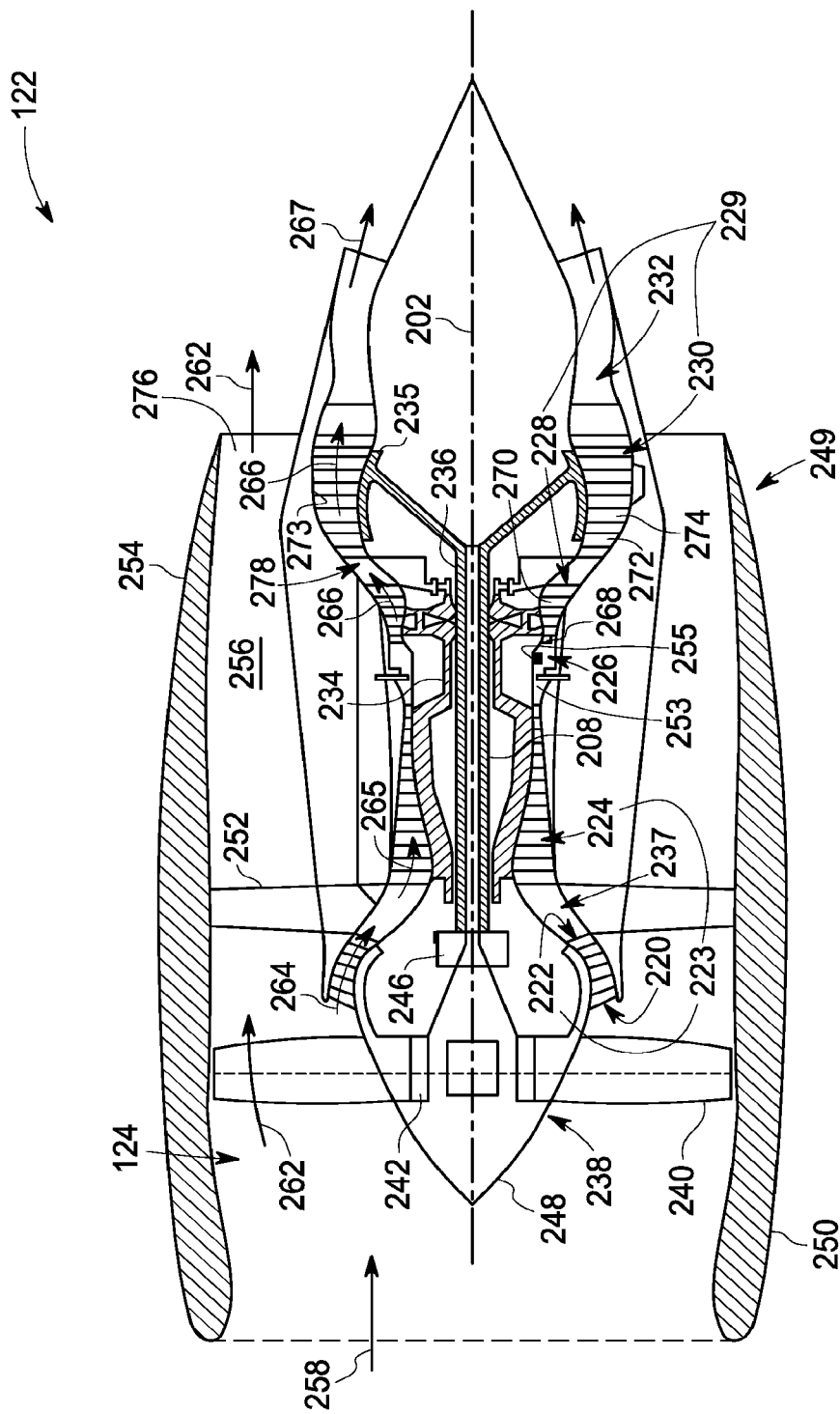
FIG. 2 illustrates a schematic cross-sectional view of a gas turbine engine in accordance with one embodiment.

FIG. 2 represents a schematic cross-sectional view of the gas turbine engine 122 in accordance with one embodiment. In one example embodiment, the gas turbine engine 122 includes a compressor 223, a combustor 226, a turbine 229, and an engine casing 208 that defines an annular core engine inlet 220. The compressor 223 includes a booster or low-pressure compressor 222 and a high-pressure compressor 224. The turbine 229 includes a high-pressure turbine 228 and a low-pressure turbine 230. The engine casing 208 encloses, in serial flow relationship, i) the compressor 223 including the low-pressure compressor 222 and the high-pressure compressor 224, ii) the combustor 226, iii) the turbine 229 including the high-pressure turbine 228 and the low-pressure turbine 230 and iv) a jet exhaust nozzle 232. The high-pressure turbine 228 is operatively coupled to the high-pressure compressor 224 via a high-pressure spool 234. Similarly, the low-pressure turbine 230 is operatively coupled to the low-pressure compressor 222 via a low-pressure spool 236. The compressor 223, the combustor 226, the turbine 229, and the jet exhaust nozzle 232 together define a core fluid flow passage 237 of the gas turbine engine 122. The gas turbine engine 122 further includes a bleed fluid cavity 253 formed at a first predefined location in the high-pressure compressor 224. A heat absorption device 255 is disposed in the bleed fluid cavity 253. In the illustrated embodiment, the first predefined location is a compressor discharge nozzle (not labeled) of the high-pressure compressor 224 and the bleed fluid cavity 253 is the compressor discharge nozzle diffuser cavity. The heat absorption device 255 may include a casing, a flow path, and a phase change material filled in the casing, separated from the flow path (not shown in FIG. 2). It should be noted herein that in other embodiments, the predefined locations may include a bypass fluid flow passage of the high-pressure compressor 224 and the high-pressure turbine 228 and a tip shroud of the high-pressure compressor 224.

The fan assembly 124 includes a variable pitch fan 238 having a plurality of fan blades 240 coupled to a fan disk 242. Fan blades 240 extend radially outwardly from fan disk 242 and are rotatable about a longitudinal axis 202 by the low-pressure spool 236. Fan disk 242 is covered by a rotatable front hub 248 which is aerodynamically contoured to promote an airflow generated by the plurality of fan blades 240. Additionally, the fan assembly 124 and at least a portion of the gas turbine engine 122 are surrounded by a nacelle assembly 249 having an annular fan casing or outer nacelle 250. The outer nacelle 250 is supported by the gas turbine engine 122 via a plurality of circumferentially-spaced outlet guide vanes 252. A downstream section 254 of the outer nacelle 250 extends over an outer portion of gas turbine engine 122 to define a bypass duct 256 therebetween. The nacelle assembly 249 is coupled to the gas turbine engine 122 and the engine pylon 126.

During operation of the gas turbine engine 122, a volume of fluid 258 (i.e., air) enters gas turbine engine 122 through a plurality of inlet openings of outer nacelle 250 and/or the fan assembly 124. As a result, a first portion 262 of the volume of fluid 258 is directed into the bypass duct 256 and a second portion 264 of the volume of the fluid 258 is directed into the core fluid flow passage 237. Specifically, the second portion 264 enters the low-pressure compressor 222 and hence the pressure of the second portion 264 is slightly increased before being routed to the high-pressure compressor 224. The pressure of the second portion 264 is further increased in the high-pressure compressor 224 to generate a compressed fluid stream 265. In such embodiments, the compressed fluid stream 265 is routed into combustor 226 where the compressed fluid stream 265 is mixed with a fuel (not shown) and combusted resulting in generation of combustion gases 266.

The combustion gases 266 are routed through the high-pressure turbine 228 where thermal and/or kinetic energy of the combustion gases 266 is extracted via sequential stages of high-pressure turbine stationary airfoils or vanes 268 and high-pressure turbine rotor blades 270. The high-pressure turbine stationary airfoils or vanes 268 are coupled to the engine casing 208 and the high-pressure turbine rotor blades 270 are coupled to the high-pressure spool 234. The high-pressure spool 234 are rotated to drive the high-pressure compressor 224. The combustion gases 266 are then routed through low-pressure turbine 230 where thermal and kinetic energy is extracted from combustion gases 266 via sequential stages of stationary airfoils 272 and low-pressure turbine rotor blades 274, to generate an expanded gas stream 267. The stationary airfoils 272 are coupled to a radially inner surface 273 of the engine casing 208. The low-pressure turbine rotor blades 274 are coupled to the low-pressure spool 236 through a rotor 235. The low-pressure spool drives the low-pressure compressor 222 and/or the variable pitch fan 238. The expanded gas stream 267 are subsequently routed through the jet exhaust nozzle 232 of the gas turbine engine 122 to generate propulsion thrust. Simultaneously, the pressure of the first portion 262 is substantially increased because the first portion 262 is routed through the bypass duct 256 before being exhausted from a fan exhaust nozzle 276 of the gas turbine engine 122. The high-pressure turbine 228, the low-pressure turbine 230, and the jet exhaust nozzle 232 at least partially define a hot gas path 278 for routing the combustion gases 266 through the gas turbine engine 122.

During normal operating condition of the gas turbine engine 122, the gas turbine engine 122 is configured to generate the compressed fluid stream 265 and the expanded gas stream 267 which are at nominal operating temperature of the gas turbine engine 122. However, during certain transient operating conditions, such as take-off stage or climbing stage of the propulsion system 100, the compressed fluid stream 265 are typically at a higher operating temperature. In such embodiments, a portion of the compressed fluid stream 265 (also referred to as an inlet bleed fluid) are directed to the heat absorption device 255 to exchange heat between the phase change material and the input bleed fluid to cool the input bleed fluid, generate an output bleed fluid (not labeled in FIG. 2), and discharge the output bleed fluid to one or more components disposed at a second predefined location different from the first predefined location. In the illustrated embodiment, the second predefined location may be the bypass fluid flow passage (not shown) extending from the high-pressure compressor 224 to the high-pressure turbine 228 bypassing the combustor 226 or a conduit (not shown) extending from the low-pressure turbine 230 to a turbine center frame (not shown) used to couple the high-pressure turbine 228 to the low-pressure turbine 230. It should be noted herein that cooling of the input bleed fluid may prevent creep and degradation of the one or more components in the fluid flow passage. In one embodiment, the fluid flow passage may include a rotor-stator cavity of the high-pressure compressor 224 and the high-pressure turbine 228, a labyrinth seal (not shown), and an angel wing (not shown) coupled to a rotor of the high-pressure turbine 228.

Figure 3:
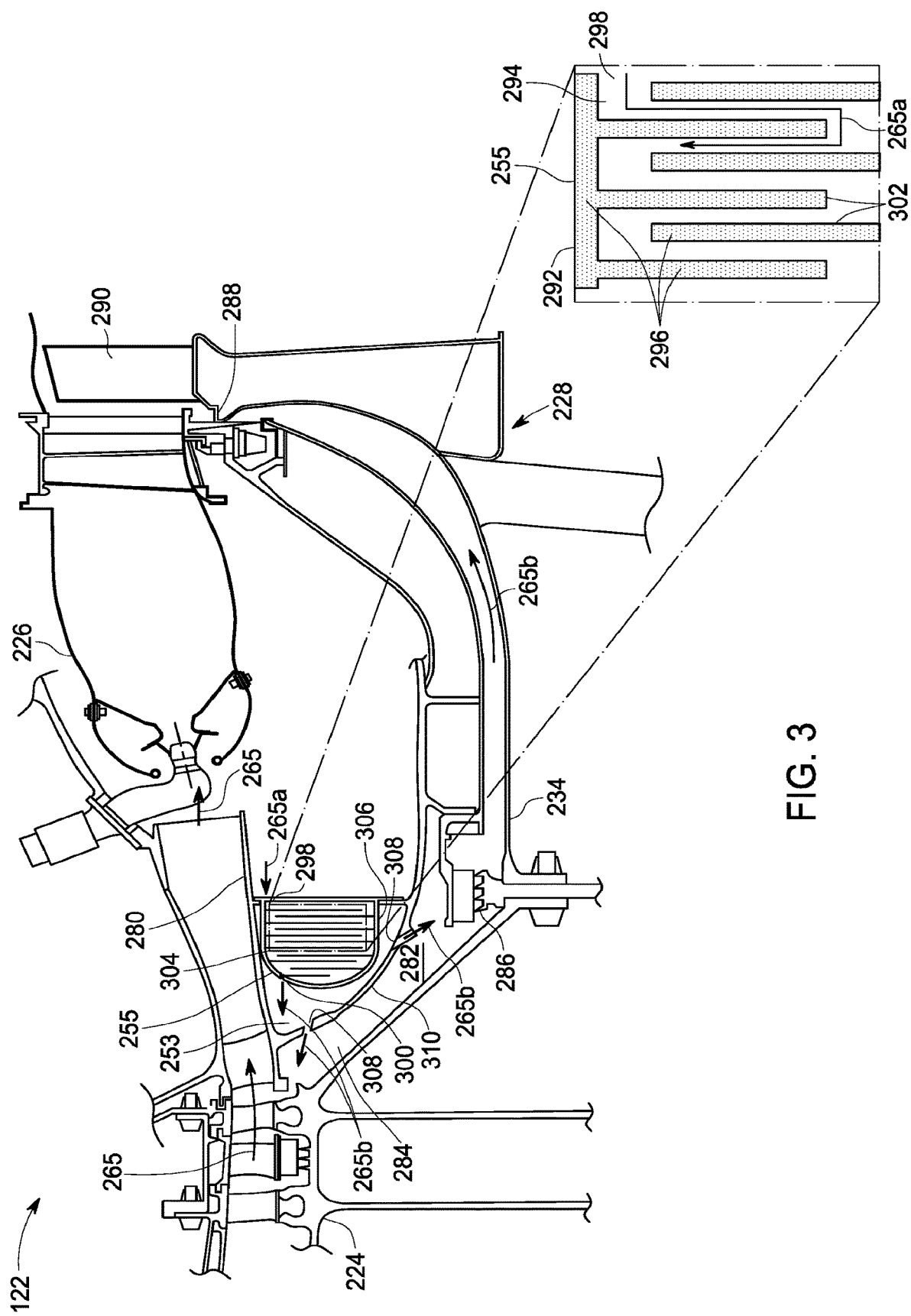
FIG. 3 illustrates a schematic representation of a portion of a gas turbine engine including a heat absorption device in accordance with one embodiment.

FIG. 3 represents a schematic representation of a portion of the gas turbine engine 122 in accordance with one embodiment. In the illustrated embodiment, the gas turbine engine 122 includes the high-pressure compressor 224, the combustor 226, the high-pressure turbine 228, the compressor discharge nozzle diffuser cavity 253 formed at a first predefined location such as a compressor discharge nozzle 280, and a heat absorption device 255. The high-pressure compressor 224 is coupled to the high-pressure turbine 228 via the high-pressure spool 234. The high-pressure compressor 224 is fluidically coupled to the combustor 226 via the compressor discharge nozzle 280. Further, the high-pressure compressor 224 is fluidically coupled to the high-pressure turbine 228 via a fluid flow passage 282 bypassing the combustor 226. In the illustrated embodiment, the fluid flow passage 282 includes a rotor-stator cavity 284, a labyrinth seal 286, and an angel wing 288 of one rotor 290 of the high-pressure turbine 228.

In the illustrated embodiment, the heat absorption device 255 is disposed in the compressor discharge nozzle diffuser cavity 253 and coupled to a lower diffuser arm 310 of the compressor discharge nozzle 280. The heat absorption device 255 includes a casing 292, a flow path 294, and a phase change material 296 filled in the casing 292 and separated from the flow path 294. The casing 292 includes an inlet 298 and an outlet 300. In the illustrated embodiment, the outlet 300 is disposed at an opposite side of the inlet 298. The flow path 294 is formed within the casing 292 and extends between the inlet 298 and the outlet 300. In the illustrated embodiment, the flow path 294 is defined by a plurality of casing columns 302 disposed spaced apart from each other. Further, the mutually adjacent casing columns are coupled to opposite sides 304, 306 of the casing 292. In one embodiment, each of the plurality of casing columns 302 and the casing 292 define a hollow structure filled with the phase change material 296. Specifically, in the illustrated embodiment, the casing 292 and the plurality of casing columns 302 are in fluid communication with each other. The phase change material 296 is hermetically sealed within the casing 292 and the plurality of casing columns 302. Hence, the phase change material 296 is not in physical contact with the flow path 294 and do not leak to the flow path 294. In one embodiment, the phase change material 296 includes one of a metal chloride, a metal carbonate, a metal nitrate, a metal nitrite, a metal fluoride, a metal hydroxide, a metal hydride, and a metal. In one specific embodiment, the phase change material 296 includes a metal chloride including one of a lithium chloride, a magnesium chloride, a sodium chloride, a mixture of a sodium chloride and a calcium chloride, and a mixture of a sodium chloride and a potassium chloride. In some embodiments, the phase change material 296 is lithium chloride. In such embodiments, the lithium chloride is in a solid phase at a temperature of 1250 degrees Fahrenheit and configured to absorb the heat without changing a state/phase. Lithium chloride material may absorb latent heat and change state from a solid phase to a liquid phase at a temperature of 1250 degrees Fahrenheit. In some embodiments, the phase change material 296 includes a metal carbonate including one of a lithium carbonate and a mixture of a sodium carbonate and a potassium carbonate. In some other embodiments, the phase change material 296 includes a metal including at least one of aluminum, zinc, lead, bismuth, lithium, and tin.

As discussed herein, during operation of the gas turbine engine 122, the high-pressure compressor 224 of the gas turbine engine 122 increases pressure of second portion 264 of the volume of the fluid 258 received from the low-pressure turbine 230 and generate the compressed fluid stream 265. The compressed fluid stream 265 is discharged from the high-pressure compressor 224 to the combustor 226 via the compressor discharge nozzle 280. In such an embodiment, an input bleed fluid 265a separated from the compressed fluid stream 265 is discharged to the compressor discharge nozzle diffuser cavity 253 formed proximate to the lower diffuser arm 310 of the compressor discharge nozzle 280. Further, the input bleed fluid 265a is directed from the inlet 298 to the outlet 300 through the flow path 294. As a result, there is heat exchange between the phase change material 296 filled within the casing 292 and the input bleed fluid 265 a resulting in generation of an output bleed fluid 265b. The heat absorption device 255 is configured to discharge the output bleed fluid 265b to the fluid flow passage 282 (i.e., second predefined location) in the gas turbine engine 122. In the illustrated embodiment, the lower diffuser arm 310 of the compressor discharge nozzle 280 includes a plurality of holes 308 to direct the output bleed fluid 265b received from the outlet 300 of the heat absorption device 255 to the fluid flow passage 282. In certain embodiments, the output bleed fluid 265b may be additionally used to purge a flow of the compressed fluid stream 265 directly from the high-pressure compressor 224 to the fluid flow passage 282.

In one embodiment, during normal operating condition, the phase change material 296 may absorb heat from the input bleed fluid 265a to cool the input bleed fluid 265a and generate the output bleed fluid 265b. In such a condition, the temperature of the input bleed fluid 265 a may be in a range from about 1000 degrees Fahrenheit to about 1200 degrees Fahrenheit, for example. During a transient operating condition of the propulsion system, the temperature of the input bleed fluid 265a may be in a range from about 1200 degrees Fahrenheit to about 1400 degrees Fahrenheit, for example. During such a transient condition, the phase change material 296 may cool the input bleed fluid 265 a by absorbing latent heat from the input bleed fluid 265a and change the state of the phase change material 296 from the solid phase (i.e., a first phase) to the liquid phase (i.e., a second phase). Hence, the output bleed fluid 265b having substantially low temperature, discharged to the fluid flow passage 282 may not creep and/or degrade one or more components in the fluid flow passage 282, for example, the rotor-stator cavity 284, the labyrinth seal 286, and the angel wing 288 of the rotor 290 of the high-pressure turbine 228. Further, during a normal operating condition after the transient operating condition, the phase change material 296 heats the input bleed fluid 265a by releasing heat from the phase change material 296, resulting in change of state from liquid phase to the solid phase. In one embodiment, the transient operating conditions may be a take-off stage or a climbing stage of the propulsion system.

Figure 4:
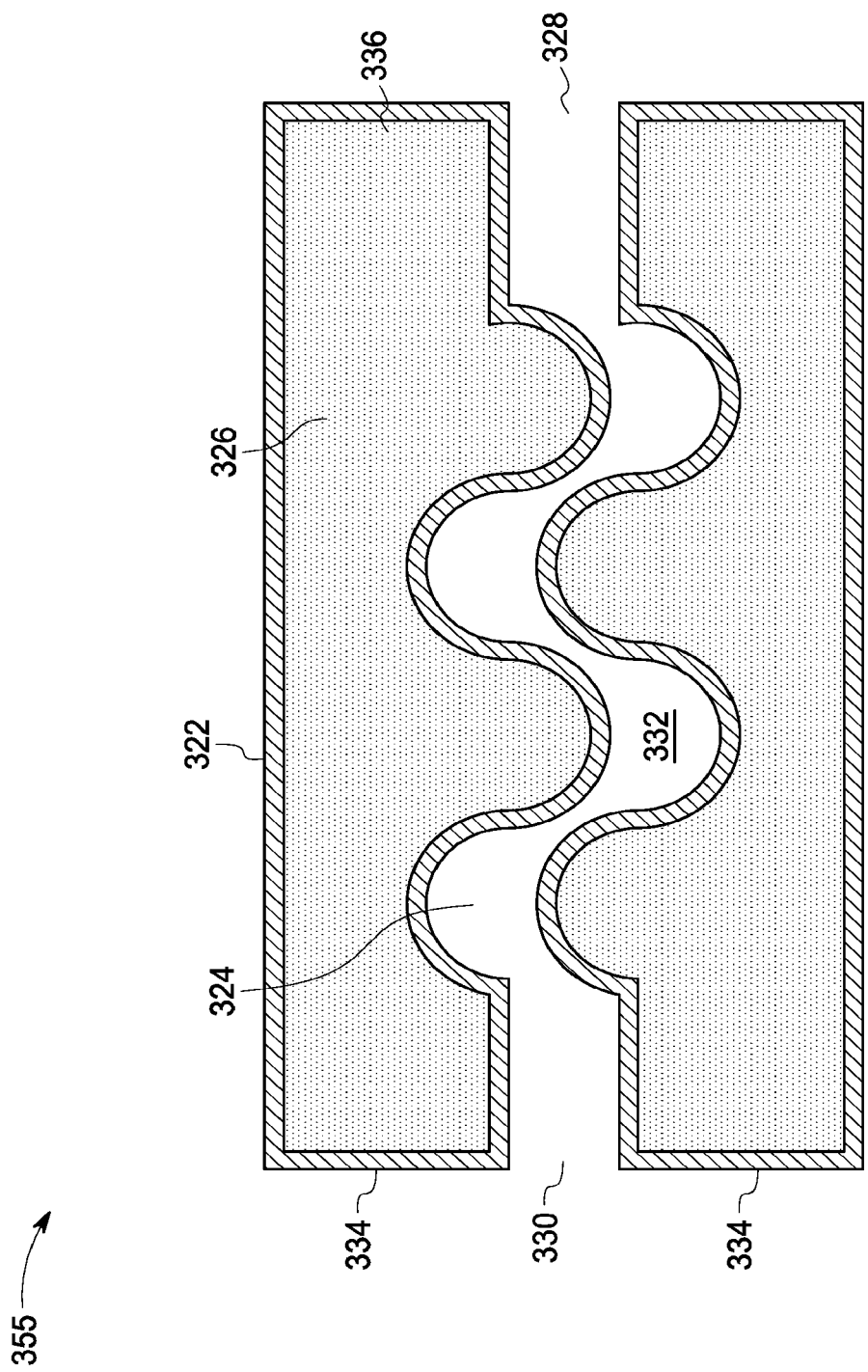
FIG. 4 illustrates a schematic representation of a heat absorption device in accordance with another embodiment.

FIG. 4 represents a schematic representation of a heat absorption device 355 in accordance with another embodiment. In the illustrated embodiment, the heat absorption device 355 includes a casing 322, a flow path 324, and a phase change material 326 filled in the casing 322 and separated from the flow path 324. The casing 322 includes an inlet 328 and an outlet 330. The flow path 324 is formed within the casing 322 and extends between the inlet 328 and the outlet 330. Specifically, the flow path 324 is defined by a circuitous conduit 332 of the casing and coupled to the casing by a plurality of support structure 334. In the illustrated embodiment, the circuitous conduit 332 is disposed within the casing 322 such that a gap 336 is formed between the casing 322 and the circuitous conduit 332. Specifically, the gap 336 is filled with the phase change material 326. Specifically, in the illustrated embodiment, the casing 322 and the circuitous conduit 332 are hermetically sealed such that the phase change material 326 is not in a physical contact with the flow path 324 and hence do not leak to the flow path 324.

It should be noted herein that the configuration of the heat absorption devices 255, 355 as depicted in the embodiments of FIGS. 3 and 4 should not be construed as a limitation of the current disclosure. It should be noted herein that the heat absorption devices are not limited to the embodiments of FIGS. 3 and 4. In other embodiments, the heat absorption devices 255, 355 may have various other configurations. In some embodiments, the heat absorption devices 255, 355 may be manufactured using metal sheets. In some other embodiments, the heat absorption devices 255, 355 may be manufactured using additive manufacturing techniques.

Figure 5:
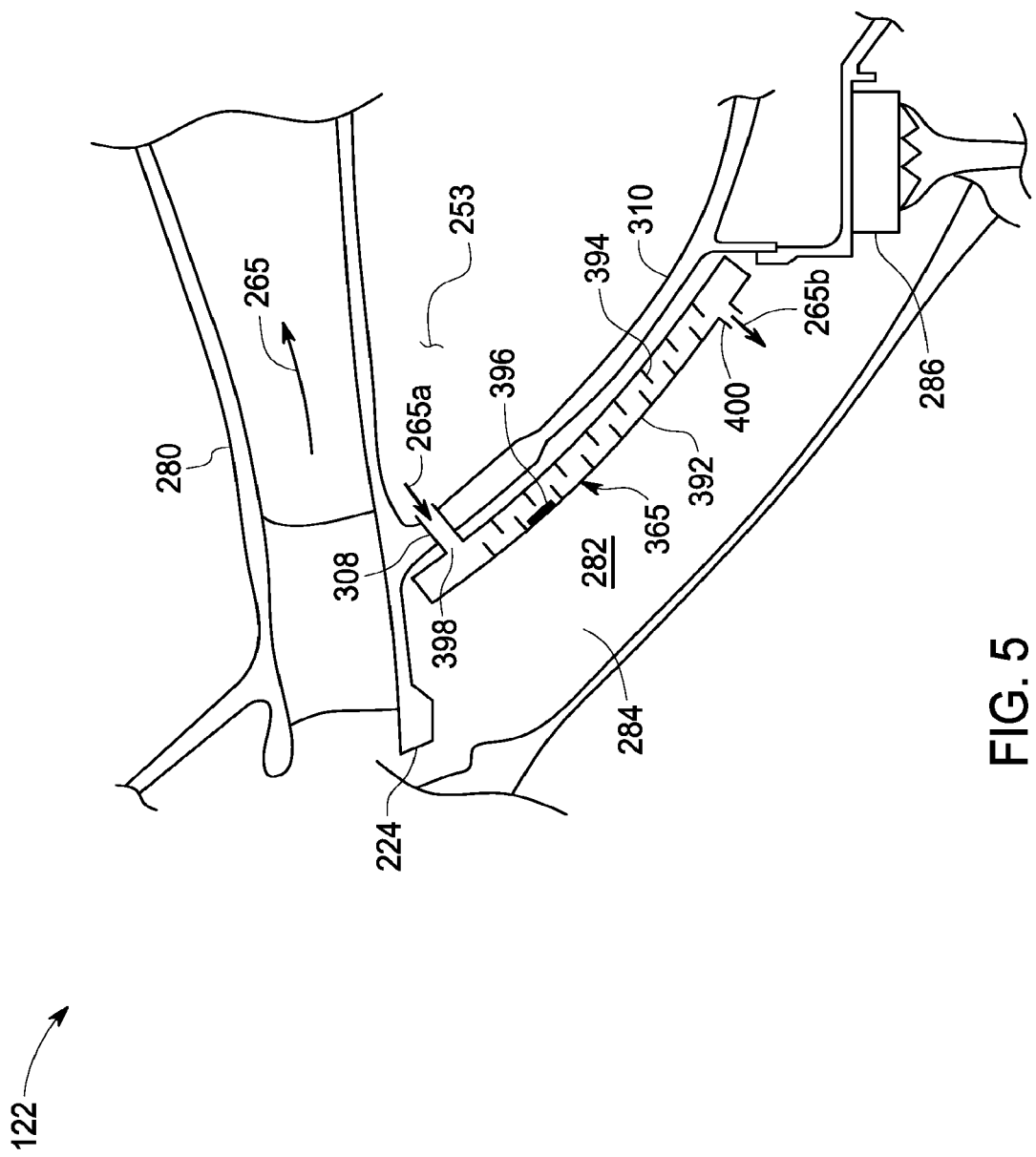
FIG. 5 illustrates a schematic representation of a portion of a gas turbine engine including a heat absorption device in accordance with one embodiment.

FIG. 5 represents a schematic representation of a portion of the gas turbine engine 122 in accordance with one embodiment. In the illustrated embodiment, the gas turbine engine 122 includes the high-pressure compressor 224 having the compressor discharge nozzle 280, the compressor discharge nozzle diffuser cavity 253 formed at the compressor discharge nozzle 280, and the fluid flow passage 282 bypassing the combustor 226. The gas turbine engine 122 further includes the rotor-stator cavity 284 (also referred to as bleed fluid cavity), and a heat absorption device 365 disposed in the rotor-stator cavity 284 coupled to a lower diffuser arm 310. In the illustrated embodiment, the rotor-stator cavity 284 is a bleed fluid cavity of the high-pressure compressor 224 and the high-pressure turbine, and the first predefined location is the fluid flow passage 282. In the illustrated embodiment, the fluid flow passage 282 further includes the labyrinth seal 286 disposed downstream relative to the heat absorption device 365. The heat absorption device 365 includes a casing 392, a flow path 394, and a phase change material 396 filled in the casing 392 and separated from the flow path 394. The casing 392 includes an inlet 398 and an outlet 400. The flow path 394 is formed in the casing 392 and extends from the inlet 398 to the outlet 400. In the illustrated embodiment, the input bleed fluid 265*a* is separated from the fluid stream 265 and discharged to the compressor discharge nozzle diffuser cavity 253 and then to the heat absorption device 365 disposed in the rotor-stator cavity 284 via the holes 308 formed in the lower diffuser arm 310. Specifically, the heat absorption device 365 receives the input bleed fluid 265 *a* via the inlet 298 of the casing 392. The flow path 394 in the heat absorption device 365 directs the input bleed fluid 265*a* from the inlet 398 to the outlet 400 of the casing 392. As a result, heat is exchanged between the phase change material 396 filled in the casing 392 and the inlet bleed fluid 265*a* to generate an output bleed fluid 265*b*. The outlet bleed fluid 265*b* is discharged to the downstream labyrinth seal 286 and the rotor 290 (shown in FIG. 3) via the fluid flow passage 282 without causing degradation of or creep the components.

Figure 6:
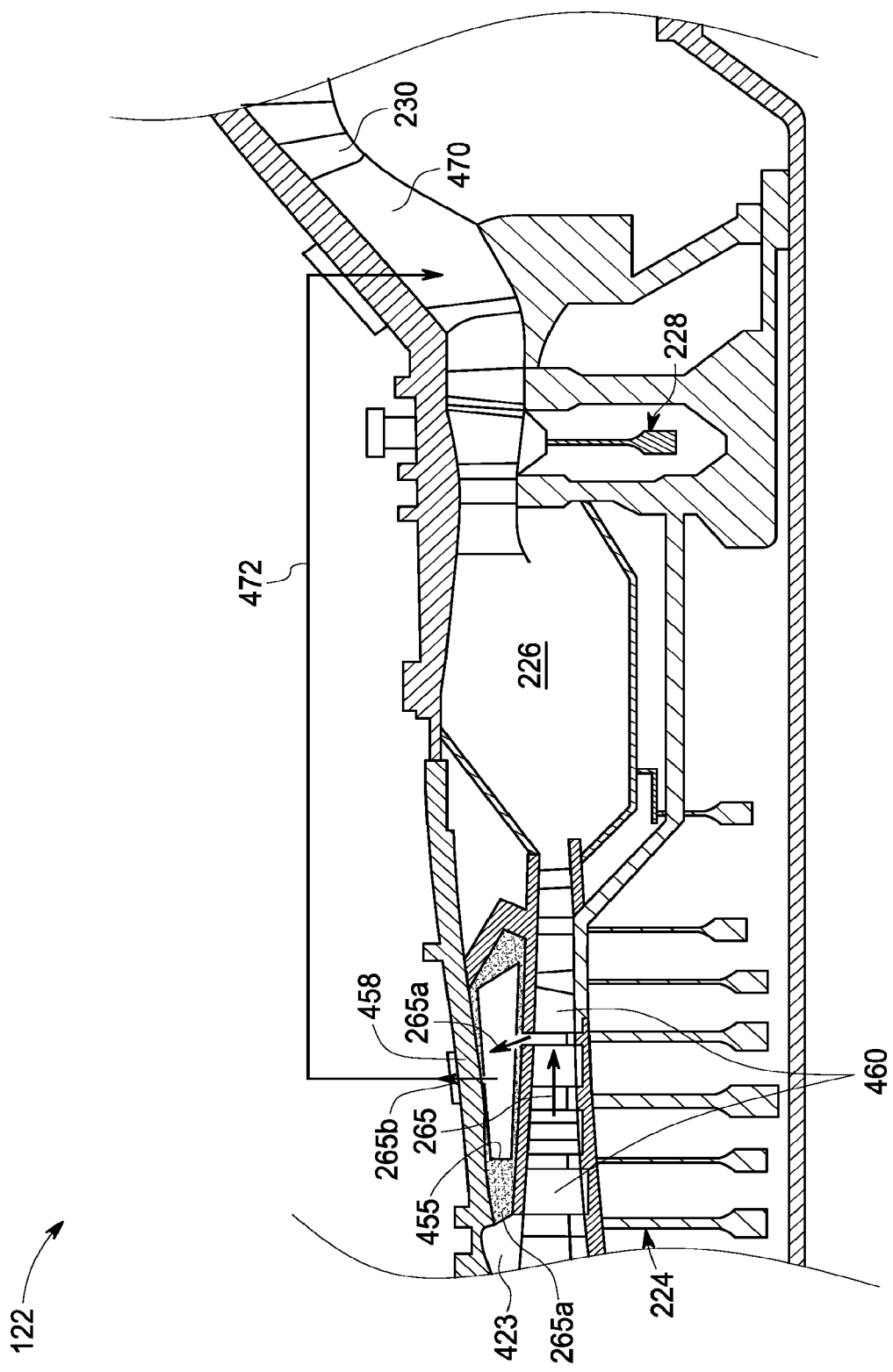
FIG. 6 illustrates a schematic representation of another portion of a gas turbine engine including a heat absorption device in accordance with one embodiment.

FIG. 6 represents a schematic representation of another portion of the gas turbine engine 122 in accordance with one embodiment. In the illustrated embodiment, the gas turbine engine 122 includes the high-pressure compressor 224, the combustor 226, the high-pressure turbine 228, the low-pressure turbine 230, a bleed fluid cavity, for example a tip shroud cavity 423, and a heat absorption device 455. In the illustrated embodiment, the high-pressure turbine 228 is physically coupled to the low-pressure turbine 230 by a turbine center frame 470. In the illustrated embodiment, the high-pressure compressor 224 includes a tip shroud 457 formed at a portion of a compressor casing 458 facing a tip of rotors 460. In one embodiment, the tip shroud cavity 423 is formed at the tip shroud 457 and the heat absorption device 455 is coupled to the compressor casing 458 and disposed in the bleed fluid cavity 423. In one embodiment, the bleed fluid cavity 423 is a tip shroud cavity of the high-pressure compressor 224. During operation of the gas turbine engine 122, the high-pressure compressor 224 is configured to discharge the compressed fluid stream 265 to the combustor 226. The input bleed fluid 265*a* is separated from the fluid stream 265 at the tip shroud 457 and discharged to the tip shroud cavity 423. The heat absorption device 455 is configured to exchange heat between the phase change material and the input bleed fluid 265*a* to cool the input bleed fluid 265*a* and generate an output bleed fluid 265*b*. In one embodiment, the output bleed fluid 265*b* is discharged from the tip shroud cavity 423 to a second predefined location such as the turbine center frame 470 via a conduit 472, thereby preventing degradation and creep of the turbine center frame 470. In such an embodiment, the conduit 472 extends from the tip shroud 457 to the turbine center frame 470.

In accordance with certain embodiments discussed herein, a heat absorption device is used to exchange heat indirectly between an input bleed fluid and a phase change material, thereby regulating a temperature of the input bleed fluid discharged to a predefined location having one or more components. The service life of the one or more components may be enhanced by regulating temperature of the input bleed fluid, thereby preventing creep and degradation of one or more components. The exemplary heat absorption device enables to control temperature of the input bleed fluid during certain transient operating condition of a turbojet engine. Hence, there is no need for usage of high temperature alloy material for manufacturing one or more components to withstand higher operating temperatures of the input bleed fluid.

While only certain features of embodiments have been illustrated, and described herein, many modifications and changes will occur to those skilled in the art. It is, therefore, to be understood that the appended embodiments are intended to cover all such modifications and changes as falling within the spirit of the disclosed technique.

What is claimed is:

1. A gas turbine engine comprising:
   a compressor comprising a compressor discharge nozzle;
   a combustor coupled to the compressor;
   a turbine coupled to the combustor and the compressor;
   a fluid flow passage fluidly coupling the compressor and the turbine and bypassing the combustor; and
   a heat absorption device disposed along the fluid flow passage at a first location, wherein the heat absorption device comprises:
   a casing comprising an inlet and an outlet, wherein the inlet and the outlet are coupled to the fluid flow passage;
   a flow path within the casing and extending between the inlet and the outlet, wherein the flow path directs an input bleed flow from the fluid flow passage, wherein the input bleed flow is diverted from a fluid stream of the compressor; and
   a phase change material hermetically sealed within the casing, the phase change material being separated from the flow path, wherein the heat absorption device is configured to exchange heat between the phase change material and the input bleed flow to generate an output bleed flow of a different temperature than the input bleed flow and discharge the output bleed flow into the fluid flow passage to a second location different from the first location.

2. The gas turbine engine of claim 1, the gas turbine engine comprising: a bleed fluid cavity formed along the fluid flow passage.

3. The gas turbine engine of claim 2, wherein the bleed fluid cavity is one of a compressor discharge nozzle diffuser cavity of the compressor, a compressor rotor-stator cavity, a turbine rotor-stator cavity, a labyrinth seal, an angel wing of the turbine, or a tip shroud cavity of the compressor.

4. The gas turbine engine of claim 1, wherein the fluid flow passage comprises a conduit extended from the compressor to the turbine.

5. The gas turbine engine of claim 4, wherein the conduit is coupled to a turbine center frame at the turbine.

6. The gas turbine engine of claim 5, wherein the second location is the turbine center frame.

7. The gas turbine engine of claim 4, wherein the conduit is extended from a tip shroud at the compressor to the turbine.

8. The gas turbine engine of claim 1, wherein the phase change material comprises one of a metal chloride, a metal carbonate, a metal nitrate, a metal nitrite, a metal fluoride, a metal hydroxide, a metal hydride, or a metal.

9. The gas turbine engine of claim 1, wherein the phase change material comprises a metal chloride comprising one of a lithium chloride, a magnesium chloride, a sodium chloride, a mixture of a sodium chloride and a calcium chloride, or a mixture of a sodium chloride and a potassium chloride.

10. The gas turbine engine of claim 1, wherein the phase change material comprises a metal carbonate comprising one of a lithium carbonate and a mixture of a sodium carbonate or a potassium carbonate.

11. The gas turbine engine of claim 1, wherein the phase change material comprises a metal comprising at least one of aluminum, zinc, lead, bismuth, lithium, or tin.

12. A system comprising:
a frame;
a plurality of airfoils coupled to the frame; and
at least one gas turbine engine coupled to the plurality of airfoils, wherein the at least one gas turbine engine comprises:
   a compressor comprising a compressor discharge nozzle;
   a combustor coupled to the compressor;
   a turbine coupled to the combustor and the compressor;
   a fluid flow passage fluidly coupling the compressor and the turbine and bypassing the combustor; and
   a heat absorption device disposed along the fluid flow passage at a first location, wherein the heat absorption device comprises:
      a casing comprising an inlet and an outlet, wherein the inlet and the outlet are coupled to the fluid flow passage;
      a flow path within the casing and extending between the inlet and the outlet, wherein the flow path directs an input bleed flow from the fluid flow passage, wherein the input bleed flow is diverted from a fluid stream of the compressor; and
      a phase change material hermetically sealed within the casing, the phase change material being separated from the flow path, wherein the heat absorption device is configured to exchange heat between the phase change material and the input bleed flow to generate an output bleed flow of a different temperature than the input bleed flow and discharge the output bleed flow into the fluid flow passage to a second location different from the first location.

13. The system of claim 12, the system comprising: a bleed fluid cavity formed along the fluid flow passage.

14. The system of claim 13, wherein the bleed fluid cavity is one of a compressor discharge nozzle diffuser cavity of the compressor, a compressor rotor-stator cavity, a turbine rotor-stator cavity, a labyrinth seal, an angel wing of the turbine, or a tip shroud cavity of the compressor.

15. The system of claim 12, wherein the fluid flow passage comprises a conduit extended from the compressor to the turbine.

16. The system of claim 12, wherein the phase change material comprises one of a metal chloride, a metal carbonate, a metal nitrate, a metal nitrite, a metal fluoride, a metal hydroxide, a metal hydride, or a metal.

17. A method comprising:
directing an input bleed flow from a fluid stream discharged from a compressor of a gas turbine engine to a bleed fluid cavity formed at a first location of a fluid flow passage, the fluid flow passage fluidly coupling the compressor and a turbine of the gas turbine engine, the fluid flow passage bypassing a combustor of the gas turbine engine;
directing the input bleed flow from the fluid flow passage through a flow path extending from an inlet of a casing of a heat absorption device to an outlet of the casing of the heat absorption device;
exchanging heat between the input bleed flow and a phase change material of the heat absorption device to generate an output bleed flow at a different temperature than the input bleed flow, wherein the phase change material is hermetically sealed within the casing, the phase change material being separated from the flow path; and
discharging the output bleed flow back into the fluid flow passage to a second location in the gas turbine engine, wherein the second location is different from the first location.

* * * * *